(12) United States Patent
Amos

(10) Patent No.: US 9,652,752 B2
(45) Date of Patent: May 16, 2017

(54) DYNAMIC NETWORK TIMEOUT TUNING

(71) Applicant: NCR Corporation, Duluth, GA (US)

(72) Inventor: Mervin Amos, London (GB)

(73) Assignee: NCR Corporation, Duluth, GA (US)

( * ) Notice: Subject to any disclaimer, the term of this patent is extended or adjusted under 35 U.S.C. 154(b) by 216 days.

(21) Appl. No.: 14/448,230

(22) Filed: Jul. 31, 2014

(65) Prior Publication Data

US 2016/0034862 A1    Feb. 4, 2016

(51) Int. Cl.
*G06F 17/00* (2006.01)
*G06Q 20/10* (2012.01)
*G06Q 20/38* (2012.01)
*G06Q 20/40* (2012.01)

(52) U.S. Cl.
CPC .......... *G06Q 20/10* (2013.01); *G06Q 20/382* (2013.01); *G06Q 20/401* (2013.01); *G06Q 20/4016* (2013.01)

(58) Field of Classification Search
USPC ........................................... 235/375; 705/39
See application file for complete search history.

(56) References Cited

U.S. PATENT DOCUMENTS

| | | | |
|---|---|---|---|
| 6,116,505 A * | 9/2000 | Withrow | G06Q 20/342 235/375 |
| 2008/0062863 A1* | 3/2008 | Ginde | H04L 12/66 370/221 |

* cited by examiner

*Primary Examiner* — Rafferty Kelly
(74) *Attorney, Agent, or Firm* — Schwegman, Lundberg & Woessner

(57) ABSTRACT

Various embodiments herein each include at least one of systems, methods, software, and data structures that track timeout periods with regard to data processing requests, dynamically tune timeout periods within payment transaction processing systems, directly and indirectly decrease unproductive consumption of transaction processing resources, avoid situations giving rise to duplicate payments for a single purchase, and decrease transaction processing timeouts. Some such embodiments include monitoring a timeout period within a payment transaction processing system to stop processing and return a timeout error when a transaction timeout period is about or has expired while also stopping processing of the transaction and rolling back any portions of processing of the payment request that may have already been performed.

16 Claims, 6 Drawing Sheets

```
                              ┌─ 302
                              │
                    ┌─────────┴──────────────────────────────────────┐
                    │         TRANSACTION PROCESSING ROUTE           │
                    │                                                │
                    │ 1.0 RecPmtData_obj (cardNo, ExpDt, CVD, AMT, MrchtID; 3rdPartyAccountNo,
                    │ BaseTimoutTime);
                    │
                    │ 2.0 FindBankID (cardNo);
                    │
                    │ 3.0 ValidateCountry (RULE1=NoForeign, onDenyMsg="Foreign Bank Not Allowed";
                    │ onDenyRoute: 5.0 DENY);
                    │
                    │ 4.0 RouteTo:FraudDetect (cardno, ExpDt, CVD, AMT, MrchtID, TimeOut=TRUE,
                    │ onTrueMsg="Denied – Fraud Detect", onTrueRoute: 5.0 DENY, onFalseRoute: 7.0
                    │ idPmtType);
                    │
                    │ 5.0 Deny (6.0 OutputValidationErr=ReceivedMsg);
                    │
                    │ 6.0 OutputValidationErr (msg);
                    │
                    │ 7.0 idPmtType (crdNo, onACHRoute: 8.0 RouteTo:ACH, onCRDNetworkRoute: 9.0
                    │ RouteTo:CrdNetwork onCoreBankingRoute:10.0 RouteTo:CoreBanking);
                    │
                    │ 8.0 RouteTo:ACH (cardNo, ExpDt, CVD, AMT, MrchtID, TimeOut=TRUE,
                    │ onDeclineTORoute: 11.0 StandIn(AMT), onApproveRoute: 13.0 RouteTo:3rdParty);
                    │
                    │ 9.0 RouteTo:CrdNetwork (cardNo, ExpDt, CVD, AMT, MrchtID, TimeOut=TRUE,
                    │ onDeclineTORoute: 11.0 StandIn(AMT), onApproveRoute: 13.0 RouteTo:3rdParty);
                    │
                    │ 10.0 RouteTo:CoreBanking (cardNo, ExpDt, CVD, AMT, MrchtID, TimeOut=TRUE,
                    │ onDeclineTORoute: 11.0 StandIn(AMT), onApproveRoute: 13.0 RouteTo:13.0 3rdParty);
                    │
                    │ 11.0 StandIn (IF(AMT<=10.00)=True ELSE=FALSE, onTrueRoute: 13.0
                    │ RouteTo:3rdParty, onFalseRoute: 12.0 OutputPaymentDecline(msg="Payment Declined"));
                    │
                    │ 12.0 OutputPaymentDecline (msg)
                    │
                    │ 13.0 RouteTo:3rdParty (3rdPartyAccountNo, Amt, onSuccessRoute: 14.0
                    │ OutputPmtApproval, onFailRoute: 15.0 RouteTo:Rollback(cardNo, AMT, MrchtID));
                    │
                    │ 14.0 OutputPmtApproval (cardNo, ExpDt, CVD, AMT, MrchtID; 3rdPartyAccountNo);
                    │
                    │ 15.0 RouteTo:Rollback (cardNo, ExpDt, CVD, AMT, MrchtID; 3rdPartyAccountNo, Route:
                    │ 16.0 Output3rdPartyError);
                    │
                    │ 16.0 Output3rdPartyError ();
                    └────────────────────────────────────────────────┘
```

*FIG. 3*

DYNAMIC NETWORK TIMEOUT TUNING

BACKGROUND INFORMATION

Processing of payment transactions, such as at time of tendering of a credit card during checkout at a store, triggers generation and transmission of a payment request from a merchant payment tendering device or system to a payment transaction processing system over a network. Payment request are then processed according to defined payment processes, which may include routing to other systems and services. A payment request is subject to a timeout period on the merchant payment tendering device or system. When a response is not received over the network by the merchant payment tendering device or system within the timeout period, the timeout period expires and the payment request fails.

SUMMARY

Various embodiments herein each include at least one of systems, methods, software, and data structures that track timeout periods with regard to data processing requests, dynamically tune timeout periods within payment transaction processing systems, directly and indirectly decrease unproductive consumption of transaction processing resources, avoid situations giving rise to duplicate payments for a single purchase, and decrease transaction processing timeouts. Some such embodiments include monitoring a timeout period within a payment transaction processing system to stop processing and return a timeout error when a transaction timeout period is about to or has expired while also stopping processing of the transaction and rolling back any portions of processing of the payment request that may have already been performed.

BRIEF DESCRIPTION OF THE DRAWINGS

FIG. 3 is a data structure illustration, according to an example embodiment.

DETAILED DESCRIPTION

Figure 1:
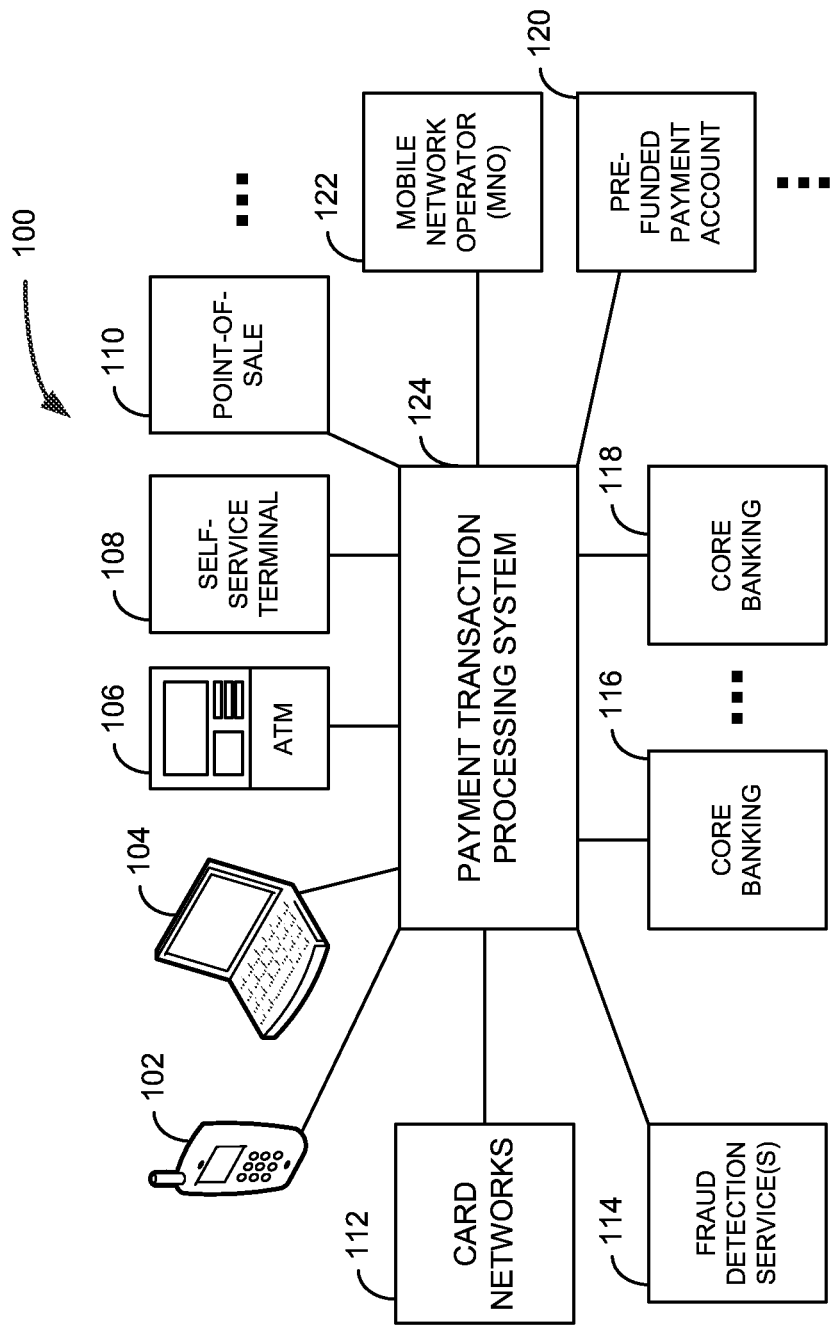
FIG. 1 is an architectural diagram of a system, according to an example embodiment.

During communication and processing of payment requests, timeout periods may expire for many different reasons such as an error in communication over a network, network latency, payment transaction processing system latency, among other reasons. Transaction requests that fail due to expired timeout periods are often resubmitted, which increases network traffic and payment transaction processing system usage. However, expiration of a timeout period on a merchant payment tendering device or system is unknown to the payment transaction processing system and processing of the payment request continues. As a result, duplicate payments may be processed for the same store transaction which can be time consuming to identify and resolve and double or more payments for a single purchase frustrate customers. Further, when the root cause of expiring timeout periods is a large volume of transaction requests, continued processing of timed out transaction requests unproductively consumes payment transaction processing system and network resources that may exacerbate latency and issues giving rise to timing out of other payment requests. Such transaction processing issues are most prone to occur during periods of peak consumer shopping, such as the Friday after the United States Thanksgiving holiday that is commonly referred to as "Black Friday."

Various embodiments herein each include at least one of systems, methods, software, and data structures that track timeout periods with regard to data processing requests, dynamically tune timeout periods within payment transaction processing systems, directly and indirectly decrease unproductive consumption of transaction processing resources, avoid situations giving rise to duplicate payments for a single purchase, and decrease transaction processing timeouts. Some such embodiments include monitoring a timeout period within a payment transaction processing system to stop processing and return a timeout error when a transaction timeout period is about or has expired while also stopping processing of the transaction and rolling back any portions of processing of the payment request that may have already been performed.

Some embodiments also include timeout periods that are set with regard to data processing nodes of defined payment processes. For example, a transaction timeout period may be 30 seconds. Within this 30-second transaction timeout period, a payment request received from a merchant payment tendering device or system must be processed and a response provided. The payment request will be processed according to a defined process that includes a plurality of data processing nodes. Some or all of the data processing nodes may include their own timeout period, referred to as an element timeout period. Element timeout periods are each generally less than a transaction timeout period, but a sum of element timeout periods involved in defined process may be greater than the transaction timeout period. In such embodiments, prior to performance of data processing associated with a data processing node of a defined process, a remaining time of the transaction timeout period may be determined. When the determined time remaining is less than the element timeout period, the element timeout period is adjusted to be within the transaction timeout period. Thus, when data processing nodes of a define process being executed are delayed, but the transaction timeout period has not yet expired, the processing continues, but with shorter element timeout periods. This allows transaction processing to continue while also allowing for rapid detection of transaction timeout conditions that give rise to problems as discussed above.

Through such embodiments, and others described herein, payment transaction processing system and network performance are improved as unproductive data processing is reduced which allows for more payment transactions to be successfully processed which indirectly reduces network traffic from retry payment requests. These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is an architectural diagram of a system 100, according to an example embodiment. The system 100 is an example of a system with many different components, many of which are operated or owned by different entities and individuals, to facilitate payment processing in a modern economy. Each of these different components form an ecosystem of compatible entities that operate to provide many payment options.

For example, payments today may be made in any number of ways beyond just physical currency. Two readily available forms of payment are credit and debit cards. These cards may be issued by banks, stores, and financial service companies, among others. Other forms of payment are prepaid payment cards, gift cards, and the like. Another form of payment is check, but modern check processing includes reading and receiving check data at the point of sale and processing the check as a form of electronic payment closer to a credit card rather than traditional check processing. Additionally, some entities, such as stores, have begun issuing store debit cards that are tied to a cardholder's checking account. Payments with such cards are then processed as bank account automated clearinghouse (ACH) transactions. Further, these and other forms of payment may be associated with registered signatures, such as electronic codes that may be transmitted by mobile computing devices, radio frequency identification (RFID) chips, user identifier and password protected accounts, and the like. The system 100 provides a view of some of these payment options and although not all payment options are illustrated, the system 100 is provided only as an example and is not intended to exclude such additional and other payment options.

The system 100 includes a number of terminals and mechanisms through which payments may be made and currency withdrawn. For example, point-of-sale terminals 110 such as cash registers and standalone credit card transaction initiation devices, self-service terminal such as self-service checkouts and kiosks, automated teller machines (ATM), personal computers 104 such as when accessing electronic commerce websites to order products and services or to make payments, mobile devices 102 such as mobile phones and tablets through which content may be purchased and other transactions similar to personal computers 104 may be conducted, and the like. These terminals 102, 104, 106, 108, 110, among others, typically connect, either directly or indirectly, via one or more networks to a transaction processing system, such as the payment transaction processing system 124 (system 124). The one or more networks may be ad hoc connections made via a public switched telephone network (PSTN), secure communications via public networks such as virtual private network connections established via the Internet, dedicated networks, and other networks.

The system 124 may be operated by a retailer, a bank, a transaction service provider, a credit card network, or other entity. The system 124 operates to receive transaction requests from the terminals 102, 104, 106, 108, 110, such as for payments and withdrawals, and to fulfill those transaction requests according to a defined process for payment processing. Note that references to payment processing and associated process are also inclusive, in some embodiments, of withdrawal transactions, such as from savings, checking, and money market accounts utilizing an ATM card. The defined process may be associated with an operator of a terminal 102, 104, 106, 108, 110, a type of transaction being conducted (credit or debit card, store card, prepaid or gift card, adding value to a mobile network operator (MNO) or other third-party account, and the like), a mode of tendering of payment account information (e.g., physical card tendering, RFID tendering, check tendering, user tendering of account identifying data such as through a website), requirements of an entity involved in the transaction, among other factors.

As part of a payment process, the system 124 may communicate with other network entities such as a bank or credit card network 112 and one or more fraud detection services 114 such as may be called as web services, remote function calls, and the like. The system may also communicate with one or more core banking systems 116, 118, third-party systems such as systems of an MNO 122, prefunded payment account systems 120, and other third party systems.

In a common scenario, an initiator of a payment process, such as a consumer, will initiate a transaction via a self-service or clerk assisted terminal 102, 104, 106, 108, 110 choosing a product or service to purchase, such as goods at a store or online marketplace and a transaction amount is calculated. The consumer then provides or selects payment account information and the terminal 102, 104, 106, 108, 110 transmits the data to the system 124, such as a transaction amount, a merchant identifier, and the payment account information. The terminal 102, 104, 106, 108, 110 waits for a period to receive a response from the system 124 and when no response is received after the period has elapsed, the terminal 102, 104, 106, 108, 110 cancels the payment transaction due a timeout condition. This period is a transaction timeout period. When a successful payment message is instead received prior to expiration of the timeout period, the payment transaction is concluded as payment has been received.

When the system 124 receives the data from the terminal 102, 104, 106, 108, 110, the system 124 identifies a payment process to execute, initializes a timing element to track the timeout period of the terminal 102, 104, 106, 108, 110, and executes the identified process. The process may include a card number validation function, a fraud detection function (e.g., checking a payment account number against a list of known compromised payment account numbers, comparing a card holder place of residence against a merchant place of business and applying a rule), a banking function to debit the payment account and credit a merchant account, and any other functions that may be needed based on the identified payment processing routing. As the process executes, the system 124 monitors elapsed time in view of the timeout period. The system 124, in some embodiments, includes a timeout monitoring service that monitors timeout periods with regard to payment transactions being processed. In some other embodiments, one or more data processing nodes involved in an identified process being executed consider whether the Transaction Timeout Period (TTP) has expired and whether an Element Timeout Period (ETP) of the data processing node to complete its processing is greater than an amount of time Remaining in the Transaction Timeout Period (RTTP). RTTP is equal to the Transaction Start Time (TSP) plus TTP less the current time. Or stated as equations:

$$RTTP-ETP>0 \qquad (1)$$

$$RTTP=TSP+TTP-CT \qquad (2)$$

In such embodiments, while equation (1) remains true, the TTP has not expired. The data processing nodes may make dynamic adjustments to element timeout periods and allow the transaction processing to continue, or stated differently, the ETP is adjusted to keep equation (1) in a true state. When this is no longer possible, meaning RTTP is less than or equal to zero (0), the TTP has expired. When a timeout period has expired with regard to an executing process, the executing process is terminated and a timeout message is returned to the requesting terminal 102, 104, 106, 108, 110. In some embodiments, to ensure such a message is returned to the requesting terminal 102, 104, 106, 108, 110 prior to the terminal 102, 104, 106, 108, 110 reaching its timeout period, the system 124 or data processing nodes, depending on the embodiment, consider the transaction timeout period to be of a shorter than the transaction timeout period of the terminal 102, 104, 106, 108, 110. This shorter time only may be a matter of milliseconds, but may also be adjusted or configured based on sensed network and system 124 latency and other factors. For example, where the time adjustment is 50 milliseconds (50 ms), equation 2 may be modified as follows:

$$RTTP=TSP+TTP-CT-50 \text{ ms} \qquad (3)$$

Figure 2:
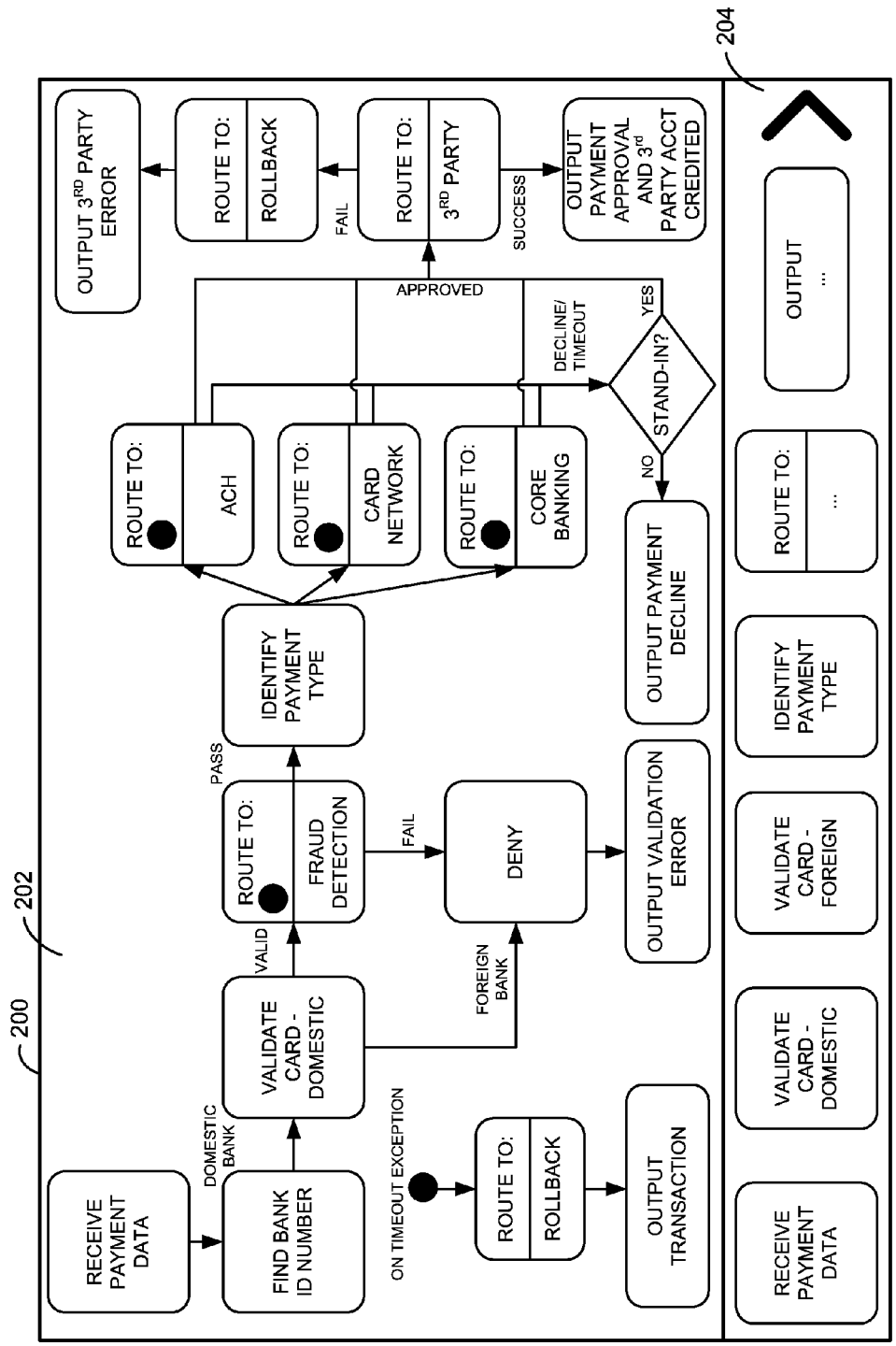
FIG. 2 is a graphical user interface of a development environment, according to an example embodiment.

FIG. 2 is a graphical user interface 200 (GUI 200) of a development environment, according to an example embodiment. In particular, the GUI 200 is an example of a graphical development environment that is used in some embodiments to define and maintain a payment transaction processes. The GUI 200 includes a payment transaction data routing and processing canvas 202 (canvas 202) and a palate 204 of selectable graphical representations of payment transaction data processing nodes that may be placed on the canvas 202 and linked to define routes of a payment transaction process. A payment process defined in the canvas 202 may then be stored and subsequently used as a payment processing routing, such as by the system 124 of FIG. 1. The GUI 200 is provided as an example development tool within which payment transaction processes may be developed and modified. Other development tools may be utilized in other embodiments, include rather simplistic text-based editors.

Input may be received within the GUI 200 via one or more input devices of a computing device presenting a view of the user interface. For example, a pointing device such as a mouse, a touch screen, a keyboard, a stylus, and other input devices. A computing device application provide the view of the GUI 200 may be a thin or thick client application or app that executes on a computing device, such as a personal computer, tablet device, other mobile device, or within a web browser or app that executes on such a device.

The palate 204 includes selectable graphical representations of payment transaction data processing nodes. Each data processing node included in the palate 204 represents a data processing task, or set of tasks, that may be included in processing a payment transaction. Data processing nodes include associated code that is executable by a computer processor to perform at least one data processing function or to make a call of a data processing service via a network. Executable code is associated with a data processing node by including a reference to a code element storage location within a data processing node, such as by inclusion of a network address or addresses from which one or more code elements may be retrieved, such as JAVA® Archives (JARs) or other containers of code elements.

Some data processing nodes available in the palate 204 may be representations of other defined payment processes that may have been created within the canvas 202 and stored. Such abilities allow a process to be added within a process being developed or modified within the canvas 202. Some other data processing nodes may include configuration options, such as some ROUTE TO data processing nodes that include selectable options to specify what type of routing or data processing is to occur. For example, a generic core banking data processing node that may include selectable options for identifying a banking entity to perform the data processing. Such options provide embedding of processes within processes and allows for sequential definition of a single end-to-end process thereby avoiding many of the limitations of prior solutions. These types of data processing nodes, in some embodiments, may be selected by manipulating a single graphical representation of the data processing node, such as with a double pointer click, to view the underlying process.

Some data processing nodes also include an element timeout period that allows such a data processing node only a certain period to complete execution or the data processing node and the payment transaction process timeout. For example, see the data processing nodes in FIG. 2 including a black dot. The block dot is an indicator that these data processing nodes include an element timeout period. In such embodiments and during execution of the process, when an element timeout period or a transaction timeout period is violated, processing is routed to the "ON TIMEOUT EXCEPTION" route which includes a rollback of any data processing nodes that are either complete or in process.

In some embodiments, the data processing nodes including the black dot also, or alternatively evaluate a transaction timeout period. For example, each of such nodes, when reached in the process, may determine an amount of time remaining in the transaction timeout period prior to performing further processing. When it is determined that the transaction timeout period has expired, executable code of the data processing node, that is either part of the data processing node or a service callable thereby, modifies at least one element of the process. This modifying may include canceling further performance of further data processing nodes of the process, issuing a rollback command with regard to any data updates already performed with regard to processing of the payment request, and transmit a status message via a network from the payment transaction processing system, such as system 124 of FIG. 1, to a source of the payment request, such as one of terminals 102, 104, 106, 108, 110, also of FIG. 1.

In other instances, when it is determined by a data processing node that the transaction timeout period has not expired but the remaining time to process the transaction request is less than the timeout period of the data processing node, adjustment is made to the data processing node timeout period to be less than the remaining transaction timeout period time and permitting data processing node execution to proceed. In further instances, when it is determined that the transaction timeout period has not expired and the remaining time to process the transaction request is greater than the data processing node timeout period, processing of the data processing node is allowed to proceed.

The canvas 202 is a GUI 200 component within which data processing nodes are placed by selecting them from the palate 204, such as through drag-and-drop functionality, a double click, or other selection-and-move type functionality. Once placed on the canvas 202, data processing nodes may be configured and linked to one another with routes. Routes may be added by selecting a route object from the palate 204 in some embodiments, by selecting two data processing nodes within the canvas 202 and selecting a menu item, and by other modes depending on the particular embodiment. The links are graphically represented between the graphical representations of the graphical data processing nodes present in the canvas 202. As a process is defined within the canvas 202, an end-to-end visualization is provided. In some embodiments, a process may be defined that is rather large and complex. To accommodate for such large processes, the canvas 202 in some embodiments includes zoom in-and-out and scroll left-to-right and up-and-down functionality. Some embodiments also allow annotations to be added to the canvas 202 with regard to a process, similar to comments that may be added to computer code. The annotations are non-executable, but can be used to add notes to a graphical representation of a defined payment transaction process.

Once a user is finished manipulating a payment transaction processing process within the GUI 200, and in particular within the canvas 202, a save option may be selected, such as by selection of a menu option, pressing a combination of keyboard keys, or by default upon closing a view of the canvas 202. Storing of a payment transaction processing process, in some embodiments, includes storing a data representation of the graphical view of the payment transaction processing route including data identifying each data processing node present and routes there between as presented within the payment transaction data routing and processing canvas 202 of the GUI 200. An example of such a data representation is illustrated in FIG. 3. In some embodiments, the stored representation may be stored as a textual representation that identifies involved data processing nodes, routes between the nodes, a sequence and order of the data processing nodes, conditional routing information between the data processing nodes, arguments to be passed between data processing nodes as part of the routing, and other information. In other embodiments, executable or interpretive computer code may be generated based on code elements associated with data processing nodes, defined routings between data processing nodes, and other data defining a payment transaction processing process.

A stored representation may be later retrieved and again graphically presented within the canvas 202. Such embodiments may include receiving an input command within an application of the GUI 200 to retrieve and present a graphical rendering of the stored data representation. The stored data representation is then loaded from the data storage device on which it is stored, which may be a disk drive, database, or other storage mechanism, into a memory of the computing device. The loading may further identify each data processing node included in the loaded data and routes between the identified data processing nodes. The graphical view is then presented, which may include generate a markup language representation of the graphical view that is then transmitted to a requesting client application.

In some embodiments, a defined process may be associated with a particular merchant by a merchant identifier, a bank or other payment account custodian such as a card issuer, a particular store-type, a geographic location from which transaction requests may be received, a mode in which payment account information is provided for the transaction, and other properties or circumstances that may be associated with a payment transaction. Thus, when a payment transaction is initiated, a system implementing defined payment processing routing, such as the system 124 of FIG. 1, can identify a proper process to select, including associated transaction processing properties such as a transaction timeout period, and execute.

FIG. 3 is a data structure 302 illustration, according to an example embodiment. The data structure 302 includes a transaction processing route data structure of a stored payment process. More specifically, the data structure 302 provides an example data representation of the process modeled in the canvas 200 of FIG. 2.

The data structure 302 includes a set of numbered data processing nodes (1.0, 2.0, 3.0, . . . 16.0). Each data processing node includes trailing information that defines various properties for the data processing node. For example, each data processing node includes a name that may link or associate the data processing node to one or more underlying executable code elements or other defined processes, e.g., the included "RouteTo:" data processing nodes reference other defined processes. The trailing data may also identify expected data to be received when the data processing node is invoked, such as with regard to data processing node 1.0, certain data items are expected to invoice the defined processes. This data includes a card number, expiration date, card validation data, a transaction amount, and a merchant identifier. Some embodiments, including the illustrated embodiment, include a third-party account number, such as mobile network operator account number associated with a mobile device to which monetary credit is to be added via the process.

The trailing data of a data processing node may also include confirmation data for the respective data processing node. For example, timeout period consideration by a node, with regard to a transaction timeout period, a data processing node timeout period, or both, may be enabled. In the example data structure 302, timeout processing is turned on with regard to the 4.0, 8.0, 9.0, and 10.0 data processing nodes, as also illustrated in the process presented in the canvas 202 of FIG. 2. The timeout processing is turned on by including the configuration data "TimeOut=TRUE".

In the example data structure 302, the process is executed in a top-down manner except where there are references to skip ahead, such as with regard to the 4.0 data processing node where when a false message is returned from a call to a fraud detection process indicating no fraud was detected, the process skips ahead to the 7.0 data processing node to identify the payment type. Similarly, the 7.0 data processing node identifies the payment card type and routes the process to the next appropriate node based thereon.

Figure 4:
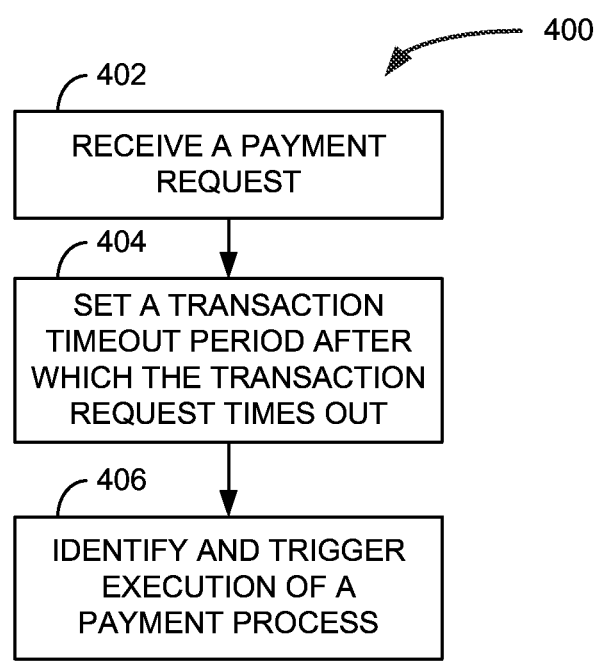
FIG. 4 is a block flow diagram of a method, according to an example embodiment.

FIG. 4 is a block flow diagram of a method 400, according to an example embodiment. The method 400 is an example of a method that may be performed by the system 124 of FIG. 1 upon receipt 402 of a payment request from a terminal, such as one of the terminals 102, 104, 106, 108, 110, also of FIG. 1.

The method 400 includes receipt 402 a payment request and setting 404 a transaction timeout period, after which the transaction times out. The method 400 further includes identifying and trigger 406 execution of a payment process. The payment process that is identified and triggered 406 may be a default payment process or a specific payment process that may be identified based on data included in the received 402 payment request. Such data may be a merchant identifier, a store number, a geographic location of the merchant or store, a country or state in which a holder of the payment account resides, and the like. During execution of the payment process, evaluation of the transaction timeout period may be performed, such as is described with regard to FIG. 5.

In some embodiments of the method 400, receiving 402 the payment request includes receiving at least one identifier that operates as a data retrieval key within a transaction processing system, or a database or other data storage mechanism, to retrieve data from which the transaction timeout period is identifiable. In one such embodiment, the at least one identifier includes a merchant identifier and the data from which the transaction timeout period is identifiable is stored in a database table that includes a plurality of merchant identifier records including data defining a timeout period for the respective merchant identifier. In some of these embodiments, the timeout period is set 404 to a time based on the retrieved data from which the transaction timeout period is identifiable less a period to allow sufficient time for a transaction processing response message to be transmitted from the payment transaction processing system and travel across the network to a source of the payment request. Setting 404 the transaction timeout period may also include adding data representative of the timeout period to a data structure the transaction processing system operates upon during processing of the payment request.

Figure 5:
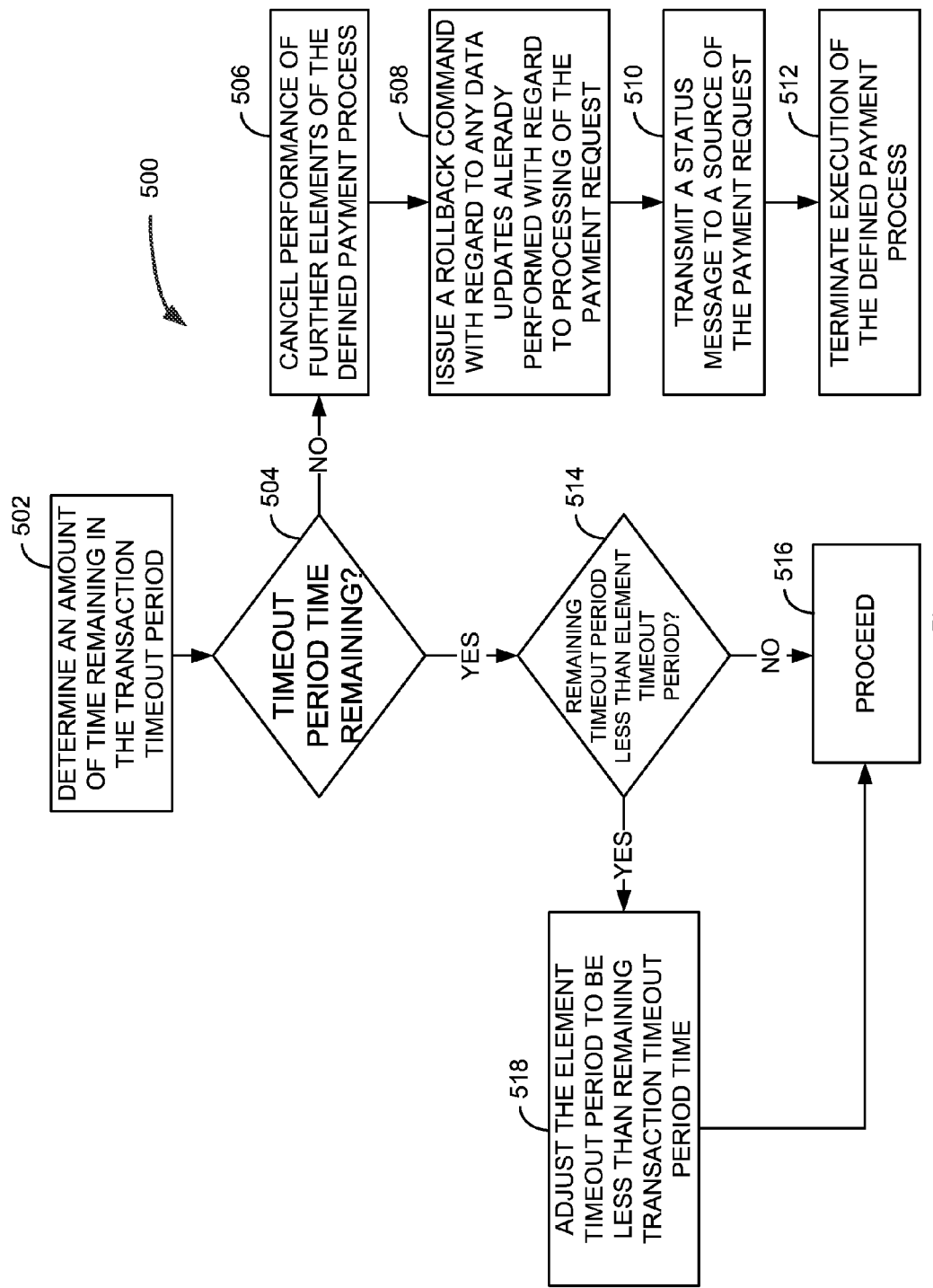
FIG. 5 is a block flow diagram of a method, according to an example embodiment.

FIG. 5 is a block flow diagram of a method 500, according to an example embodiment. The method 500 is an example of a method that may be performed by the system 124 of FIG. 1 during execution of a defined payment process in response to a payment request. In some embodiments, the method 500 is performed as part of or invoked by one or more data processing nodes, also referred to as elements.

The method 500 includes determining 502 an amount of time remaining in the transaction timeout period prior to performing further processing. A decision 504 is then made whether there is timeout period time remaining. When the when transaction timeout period has expired, the method 500 includes canceling 506 performance of further elements of the defined payment process and issuing 508 a rollback command with regard to any data updates already performed with regard to processing of the payment request. In such instances, the method 500 then transmits 510 a status message via a network to a source of the payment request and terminates 512 execution of the payment process.

When the decision 504 identifies that there is timeout period time remaining, a further decision 514 is then made to determine if the remaining timeout period is less than a timeout period of a particular element, such as a data processing node, of the payment process being executed. When the remaining timeout period is greater, processing is allowed to proceed 516. However, when the remaining timeout period is less than the element timeout, the method 500 includes adjusting 518 the element timeout period to be less than the remaining transaction timeout period time and the processing is then allowed to proceed 516. If such an adjustment is not possible, the method may then proceed (not illustrated) along the processing route of blocks 506, 508, 510, and 512.

Figure 6:
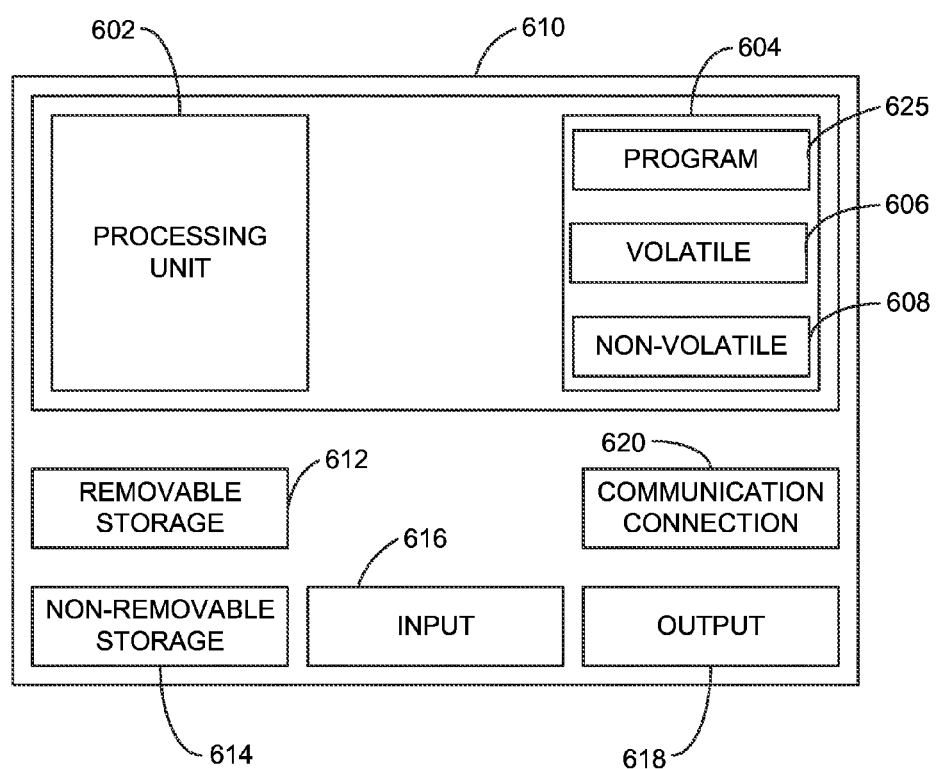
FIG. 6 is a block diagram of a computing device, according to an example embodiment.

FIG. 6 is a block diagram of a computing device, according to an example embodiment. In one embodiment, multiple such computer devices are utilized in a distributed network to implement multiple components in a transaction-based environment. An object-oriented, service-oriented, or other architecture may be used to implement such functions and communicate between multiple computing devices, systems, and components. One example computing device in the form of a computer 610, may include a processing unit 602, memory 604, removable storage 612, and non-removable storage 614. Although the example computing device is illustrated and described as computer 610, the computing device may be in different forms in different embodiments. For example, the computing device may instead be a server, a smartphone, a tablet, or other computing device including the same or similar elements as illustrated and described with regard to FIG. 6. Further, although the various data storage elements are illustrated as part of the computer 610, the storage may also, or alternatively, include network-based, cloud-based, and other storage accessible via a network, such as a local area network, system area network, the Internet, or other network.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The input 616 may include one or more of a touchscreen, touchpad, mouse, keyboard, camera, and other input devices. The computer may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A payment processing method comprising:
    receiving, via a network, a payment request by a payment processing system;
    setting a transaction timeout period after which the payment request times out by the payment processing system;
    processing, by the payment processing system, the payment request according to a defined payment process including a plurality of processing elements, at least one of the processing elements:
        determining an amount of time remaining in the transaction timeout period prior to performing further processing; and
        when transaction timeout period has expired, modifying at least one element of the defined payment process;
    wherein the at least one processing element includes an associated element timeout period, the method further including
    when determined that the transaction timeout period has not expired but the remaining time to process the payment request is less than the element timeout period, adjusting the element timeout period to be less than remaining transaction timeout period time and permitting the at least one processing element execution to proceed;
    when determined that the transaction timeout period has not expired and the remaining time to process the payment request is greater than the element timeout period, permitting the at least one processing element execution to proceed.

2. The method of claim 1, wherein modifying at least one element of the defined payment process includes:
    canceling further performance of further elements of the defined payment process;
    issuing a rollback command with regard to any data updates already performed with regard to processing of the payment request;
    transmitting a status message via the network from the payment processing system to a source of the payment request.

3. The method of claim 1, wherein receiving the payment request includes receiving at least one identifier that operates as a data retrieval key within the payment processing system to retrieve data from which the transaction timeout period is identifiable.

4. The method of claim 3, wherein the at least one identifier includes a merchant identifier and the data from which the transaction timeout period is identifiable is stored in a database table that includes a plurality of merchant identifier records including data defining a timeout period for the respective merchant identifier.

5. The method of claim 3, wherein setting the timeout period includes setting the timeout period to a time based on the retrieved data from which the transaction timeout period is identifiable less a period to allow sufficient time for a transaction processing response message to be transmitted from the payment processing system and travel across the network to a source of the payment request.

6. The method of claim 1, wherein setting the transaction timeout period includes adding data representative of the timeout period to a data structure the payment processing system operates upon during processing of the payment request.

7. A payment processing system comprising:
    at least one processor, at least one memory device, and at least one network interface device;
    at least one data storage device storing at least a portion of a payment transaction processing system that is loaded into the at least one memory device and executable by the at least one processor to:
        receive, via the at least one network interface device, a payment request;
        set a transaction timeout period after which the payment request times out;
        process the payment request according to a defined payment process including a plurality of processing elements, at least one of the processing elements:
        determining an amount of time remaining in the transaction timeout period prior to performing further processing; and
        when determined that the transaction timeout period has expired modifying at least one element of the payment process in the processing of the received payment request;
    wherein the at least one processing element includes an associated element timeout period, the method further including
    when determined that the transaction timeout period has not expired but the remaining time to process the payment request is less than the element timeout period, adjusting the element timeout period to be less than remaining transaction timeout period time and permitting the at least one processing element execution to proceed;
    when determined that the transaction timeout period has not expired and the remaining time to process the payment request is greater than the element timeout period, permitting the at least one processing element execution to proceed.

8. The system of claim 7, wherein modifying at least one element of the defined payment process in the processing of the received payment request includes:
    canceling further performance of further elements of the defined payment process;
    issuing a rollback command with regard to any data updates already performed with regard to processing of the payment request;
    transmitting a status message via the at least one network interface device to a source of the payment request.

9. The system of claim 7, wherein receiving the payment request includes receiving at least one identifier that operates as a data retrieval key within the payment transaction processing system to retrieve data from which the transaction timeout period is identifiable.

10. The system of claim 9, wherein the at least one identifier includes a merchant identifier and the data from which the transaction timeout period is identifiable is stored in a database table that includes a plurality of merchant identifier records including data defining a timeout period for the respective merchant identifier.

11. The system of claim 9, wherein setting the timeout period includes setting the timeout period to a time based on the retrieved data from which the transaction timeout period is identifiable less a period to allow sufficient time for a transaction processing response message to be transmitted from the payment transaction processing system and travel across the network to a source of the payment request.

12. A computer-readable storage medium, including instructions for a payment processing method stored thereon, which when executed by at least one processor of a computer of a payment processing system, cause the computer to:
receive, via a network, a payment request;
set, in a data structure held in memory during processing of the payment request, a transaction timeout period after which the payment request times out;
process the payment request according to a defined payment process including a plurality of processing elements, at least one of the processing elements:
determining an amount of time remaining in the transaction timeout period prior to performing further processing; and
when determined that the transaction timeout period has expired modifying at least one element of the payment process in the processing of the received payment request;
wherein the at least one processing element includes an associated element timeout period, the method further including
when determined that the transaction timeout period has not expired but the remaining time to process the payment request is less than the element timeout period, adjusting the element timeout period to be less than remaining transaction timeout period time and permitting the at least one processing element execution to proceed;
when determined that the transaction timeout period has not expired and the remaining time to process the payment request is greater than the element timeout period, permitting the at least one processing element execution to proceed.

13. The computer-readable storage medium of claim 12, wherein modifying at least one element of the defined payment process in the processing of the received payment request includes:
canceling further performance of further elements of the defined payment process;
issuing a rollback command with regard to any data updates already performed with regard to processing of the payment request;
transmitting a status message via the network from the payment processing system to a source of the payment request.

14. The computer-readable storage medium of claim 12, wherein receiving the payment request includes receiving at least one identifier that operates as a data retrieval key within the payment processing system to retrieve data from which the transaction timeout period is identifiable.

15. The computer-readable storage medium of claim 14, wherein the at least one identifier includes a merchant identifier and the data from which the transaction timeout period is identifiable is stored in a database table that includes a plurality of merchant identifier records including data defining a timeout period for the respective merchant identifier.

16. The computer-readable storage medium of claim 14, wherein the timeout period is set to a time based on the retrieved data from which the transaction timeout period is identifiable less a period to allow sufficient time for a transaction processing response message to be transmitted from the payment processing system and travel across the network to a source of the payment request.

* * * * *